Sept. 16, 1941.  G. T. SMITH  2,256,296

PULLEY OR LIKE BLOCK

Filed Aug. 1, 1939

Inventor
George Thompson Smith
By
Pennie, Davis, Marvin & Edmonds
Attorneys.

Patented Sept. 16, 1941

2,256,296

UNITED STATES PATENT OFFICE 2,256,296

PULLEY OR LIKE BLOCK

George Thompson Smith, Loughborough, England, assignor to Herbert Morris Limited, Loughborough, England, a British company Application August 1, 1939, Serial No. 287,831
In Great Britain August 2, 1938

4 Claims. (Cl. 254—169)

This invention relates to pulley or like blocks and has for its object to provide an improved and simplified construction of such blocks.

The invention is applicable to a pulley or like block provided with an epicyclic gear train in which the intermediate gears are mounted on axles which rotate about the axis of the block.

In accordance with the invention, the body or frame of the pulley or like block comprises three main members arranged to spigot into each other so that circular machining only is necessary to ensure that, when bolted together, they form a true co-axial rigid unit adapted to carry the various block components and provide an enclosure for the gears, load-chain wheel and brake assembly.

The members may be either castings, stampings, pressings or fabricated units.

Figure 1:
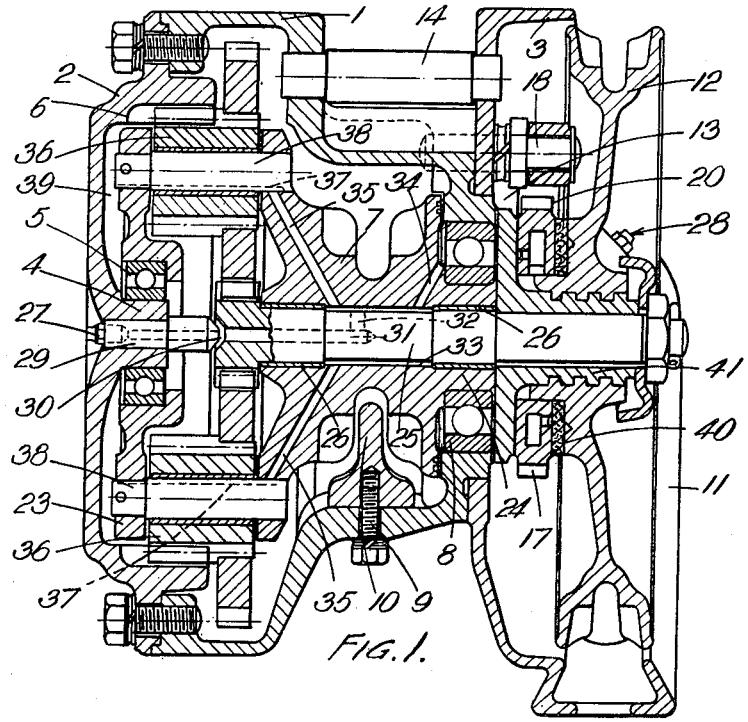
Figure 2:
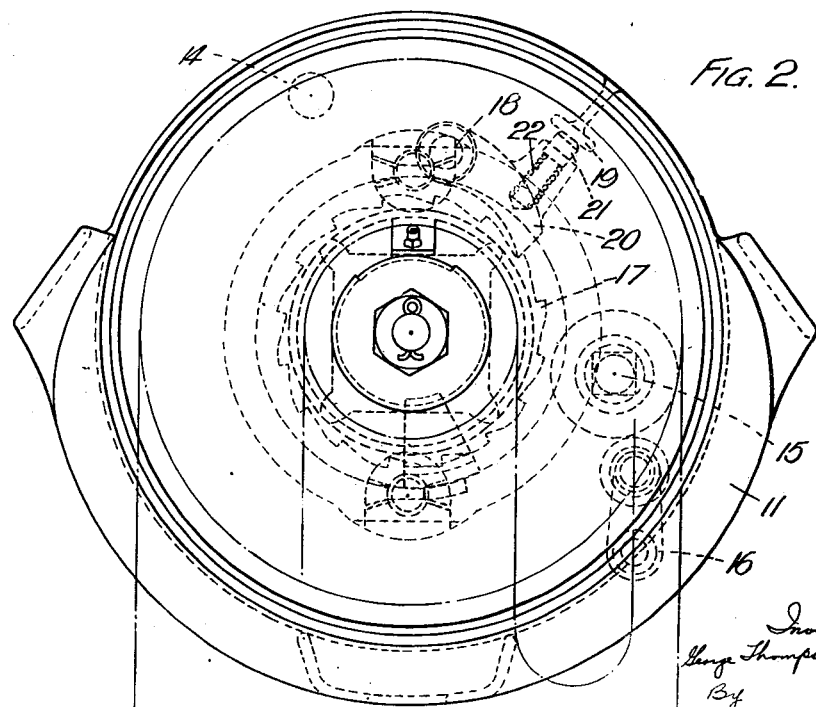

A preferred embodiment of the present invention is illustrated in the accompanying drawing in which Fig. 1 is a cross-section through the pulley block, while Fig. 2 is an end view thereof.

The body or frame of the pulley block comprises three main members, a central member 1 and end members 2 and 3, arranged to spigot one into another.

The outer member 2, forming a cover plate of the block, has a central internally projecting hollow stud 4 which carries one of the load-chain wheel supporting bearings 5. The member 2 is also provided on its inner face with an internal gear ring 6 which is shown as being formed integrally with the cover plate 2 but which may be secured thereto in any suitable manner.

The middle member 1 which encloses the load-chain wheel 7 is bored to receive the other load-chain wheel-supporting bearing 8 and has secured therein in suitable position by means of a bolt 9 the usual stripper piece 10 co-operating with the load-chain wheel 7.

The third member 3 is formed integral with a hand-chain guide 11 so shaped that it forms a protecting guard for a hand-chain wheel 12 and provides a cover for a suitable brake unit denoted generally by the reference numeral 13.

The block suspension hook bar 14, the load-chain guard spindle 15, the slack end attachment 16, the brake ratchet pawl stud 18 are carried by the middle member 1 and the end member 3. A projection 19 on the end member 3 serves to hold the pawl 20 in contact with the ratchet teeth 17 through the medium of a plunger 21 and a compression spring 22. This projection 19 also acts as a positive stop to limit the lift of the pawl 20.

The load-chain wheel 7 is preferably formed as an integral casting with a pinion-cage 23, the pinion-cage end of the casting being recessed to take the outer race of the journal bearing 5 on the hollow stud 4 of the end member 2, while the opposite, or hand-chain wheel end of the casting terminates in a projecting stud 24 on which the inner race of the other journal bearing 8 for the load-chain wheel 7 is mounted.

The centre of this integral casting is bored to provide a passage for the first-motion pinion-shaft 25 and carries supporting bearings 26 for the shaft, which bearings are shown of the plain bushed type but may be of any known anti-friction pattern.

Grease gun nipples 27, 28 one at each end of the block provide means for the lubrication of the whole of the rotating parts.

The nipple 27 is secured to or may be integral with a slidable extension piece 29 which is mounted in the bore of the hollow stud 4 of the end member 2.

The end of the extension piece 29 remote from the nipple 27 is shaped to fit into a recess 30 in the end of first-motion pinion-shaft 25 but normally it is just clear of the shaft.

When a grease gun is pushed on to the nipple 27, however, the extension piece 29 is moved into contact with the shaft 25 and the grease flows into a central passage 31 provided in the shaft from which it flows through a diametrical passage 32 into a chamber 33 surrounding the shaft 25 where it lubricates the bearings 26 for this shaft. From this chamber 33, the grease also finds its way through passages 34 in the load-chain wheel 7 to one of the load-chain wheel bearings 8 and through passages 35 to the intermediate pinions 36 on the pinion-cage 23, grooves 37 in the spindles 38 of these pinions 36 conducting excess lubricant to the back of the pinion-cage 23 where it falls into the gear case 39 and there lubricates the gears and the other bearings 5 of the load chain wheel 7.

From the other grease gun nipple 28, which may be mounted in the boss of the hand-chain wheel 12 as shown, or alternatively in the end of the shaft 25, lubricant is conducted through passages (not shown) to the friction surfaces 40, to both faces of the ratchet wheel 17, and screwed sleeve of the brake.

I claim:

1. An epicyclic pulley block comprising a circular body portion presenting an enlarged opening at one end and a restricted opening at the other end, a closing plate closing the enlarged opening and adapted to engage the circular body portion at one end and a closing plate closing the restricted opening and adapted to engage the body portion at the other end thereof, said body portion and said closing plates being shaped for inter-engaging assembly, a load-chain wheel housed within said circular body portion, said load-chain wheel carrying a pinion cage, a stud on the first mentioned closing plate, bearing journals for said load-chain wheel and pinion cage, one of said bearings mounted on said stud and the other of said bearings mounted within the restricted opening of said body portion; a hand-chain wheel at the end having said second mentioned closing plate, and a shaft operatively connecting the hand-chain wheel to the load-chain wheel for transmitting power to the load-chain wheel, said second-mentioned closing plate extending inwardly across the bearing journal mounted in the restricted opening of said body portion to said power-transmitting shaft.

2. An epicyclic pulley block comprising a circular body portion housing a load chain wheel and presenting an enlarged opening at one end and a restricted opening at the other end, a closing plate closing the enlarged opening and adapted to engage the circular body portion at one end, said closing plate presenting an internal gear ring and in conjunction with said circular body portion forming a complete enclosure for the epicyclic gearing, said epicyclic gearing including a first motion shaft supported within said load chain wheel and carrying a pinion, a pinion cage carried by said load-chain wheel and intermediate pinions carried by said cage and meshing with said pinion and with said internal gear ring, a stud on the closing plate, bearing journals for said load-chain wheel and pinion cage, one of said bearings mounted on said stud and the other of said bearings mounted within the restricted opening of said body portion, a closing plate closing the restricted opening in the body portion, a hand chain wheel at the end having said last mentioned closing plate, said first-motion shaft operatively connecting the hand-chain wheel to the load-chain wheel for transmitting power to the load-chain wheel, said second-mentioned closing plate extending inwardly across the bearing journal mounted in the restricted opening of said body portion to said shaft, said body portion and said closing plates being shaped for inter-engaging assembly.

3. An epicyclic pulley block including a circular body portion having an enlarged opening at one end and a restricted opening at the other end, of said circular body portion, a closing plate closing said enlarged opening, an internal gear ring on said plate, a stud on said closing plate, a load-chain wheel housed within said circular body portion, a pinion cage formed on said load-chain wheel, bearings for said load-chain wheel and pinion cage, one of said bearings mounted on said stud, and the other mounted within the restricted opening of said circular body portion, bearings within said load-chain wheel, a first motion shaft supported in said bearings within said load-chain wheel, a pinion carried by said shaft, intermediate pinions carried by said cage and meshing with said pinion and said internal gear ring, a second closing plate closing the restricted opening, and a hand-chain wheel mounted on said first motion shaft at the end having said second closing plate, said first-motion shaft operatively connecting the hand-chain wheel to the load-chain wheel for transmitting power to the load-chain wheel, said second-mentioned closing plate extending inwardly across the bearing journal mounted in the restricted opening of said body portion to said shaft, and a member at the end having said second closing plate shaped to provide a guide for the hand-chain over a substantial portion of said hand-chain wheel; said body portion and said closing plates being shaped for inter-engaging assembly.

4. An epicyclic pulley block including a circular body portion having an enlarged opening at one end and a restricted opening at the other end of said circular body portion, a closing plate closing said enlarged opening, an internal gear ring on said plate, a stud on said closing plate, a load-chain wheel housed within said circular body portion, a pinion cage formed on said load-chain wheel, bearings for said load-chain wheel and pinion cage, one of said bearings mounted on said stud, and the other mounted within the restricted opening of said circular body portion, bearings within said load-chain wheel, a first motion shaft supported in said bearings within said load-chain wheel, a pinion carried by said shaft, intermediate pinions carried by said cage and meshing with said pinion and said internal gear ring, a second closing plate closing the restricted opening, and a hand-chain wheel mounted on said first-motion shaft at the end having said second closing plate, said first-motion shaft operatively connecting the hand-chain wheel to the load-chain wheel for transmitting power to the load-chain wheel, said second-mentioned closing plate extending inwardly across the bearing journal mounted in the restricted opening of said body portion to said shaft, a load-chain guard and a slack-chain attachment carried by said circular body portion, a guard for the hand chain carried by the circular body portion and extending over a substantial portion of said hand-chain wheel, said body portion and said closing plates being shaped for inter-engaging assembly.

GEORGE THOMPSON SMITH.